(12) United States Patent  
Singh et al.

(10) Patent No.: US 8,369,426 B2  
(45) Date of Patent: Feb. 5, 2013

(54) REDUCING THE EFFECT OF NOISE IN A MULTI-CHANNEL TELECOMMUNICATION RECEIVER

(75) Inventors: Shailendra Kumar Singh, Unnao (IN); Patrick Duvaut, Tinton Falls, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 1312 days.

(21) Appl. No.: 12/114,169

(22) Filed: May 2, 2008

(65) Prior Publication Data

US 2008/0273638 A1    Nov. 6, 2008

Related U.S. Application Data

(60) Provisional application No. 60/927,696, filed on May 4, 2007.

(51) Int. Cl.
H04B 1/10 (2006.01)
(52) U.S. Cl. .......... 375/260; 375/349; 375/350
(58) Field of Classification Search ......... 375/222, 375/260, 267, 346, 347, 349, 350
See application file for complete search history.

(56) References Cited

U.S. PATENT DOCUMENTS

| | | | |
|---|---|---|---|
| 3,705,365 A | 12/1972 | Szabo et al. | |
| 4,283,604 A | 8/1981 | Chambers, Jr. | |
| 4,479,258 A | 10/1984 | Namiki | |
| 5,063,351 A | 11/1991 | Goldthorp et al. | |
| 5,235,617 A | 8/1993 | Mallard, Jr. | |
| 5,295,159 A | 3/1994 | Kerpez | |
| 5,315,175 A | 5/1994 | Langner | |
| 5,483,551 A | 1/1996 | Huang et al. | |
| 5,740,256 A | 4/1998 | Castello Da Costa et al. | |
| 5,822,426 A | 10/1998 | Rasmus et al. | |
| 5,887,032 A | 3/1999 | Cioffi | |
| 5,991,311 A | 11/1999 | Long et al. | |
| 6,011,814 A | 1/2000 | Martinez et al. | |
| 6,018,317 A | 1/2000 | Dogan et al. | |
| 6,021,167 A | 2/2000 | Wu | |
| 6,044,107 A | 3/2000 | Gatherer et al. | |
| 6,052,420 A | 4/2000 | Yeap et al. | |
| 6,055,297 A | 4/2000 | Terry | |
| 6,069,922 A | 5/2000 | Dyke | |
| 6,128,349 A | 10/2000 | Chow | |
| 6,137,839 A | 10/2000 | Mannering et al. | |
| 6,144,695 A | 11/2000 | Helms et al. | |
| 6,144,696 A | 11/2000 | Shively et al. | |
| 6,167,417 A | 12/2000 | Parra et al. | |
| 6,178,217 B1 * | 1/2001 | Defries et al. | 375/377 |
| 6,226,330 B1 | 5/2001 | Mansur | |
| 6,456,673 B1 | 9/2002 | Wiese et al. | |
| 6,507,620 B1 | 1/2003 | Usui | |
| 6,510,184 B1 | 1/2003 | Okamura | |
| 6,538,510 B1 | 3/2003 | Amrany et al. | |
| 6,683,913 B1 | 1/2004 | Kantschuk | |
| 6,744,811 B1 | 6/2004 | Kantschuk | |
| 6,850,423 B2 | 2/2005 | Lanni | |
| 6,999,504 B1 | 2/2006 | Amrany et al. | |
| 2006/0039454 A1 * | 2/2006 | Cioffi | 375/222 |
| 2007/0211883 A1 * | 9/2007 | Franzke et al. | 379/327 |
| 2010/0074312 A1 * | 3/2010 | Cioffi et al. | 375/222 |

* cited by examiner

*Primary Examiner* — David B. Lugo
(74) *Attorney, Agent, or Firm* — Mark J. Danielson; Pillsbury Winthrop Shaw Pittman LLP

(57) ABSTRACT

A telecommunication receiver provided according to the present invention is implemented to receive a first signal containing information and noise on a first set of sensors and a second signal containing only noise on a second set of sensors. Receiver then decodes the information using first signal and second signal. In one embodiment, a bonded DSL receiver with k signals sensors is implemented with additional s number of noise only sensors to receive only noise. Accordingly, joint demodulation is performed using signals received on k signals sensors and s noise only sensors. The noise sensor is implemented in common mode.

20 Claims, 5 Drawing Sheets

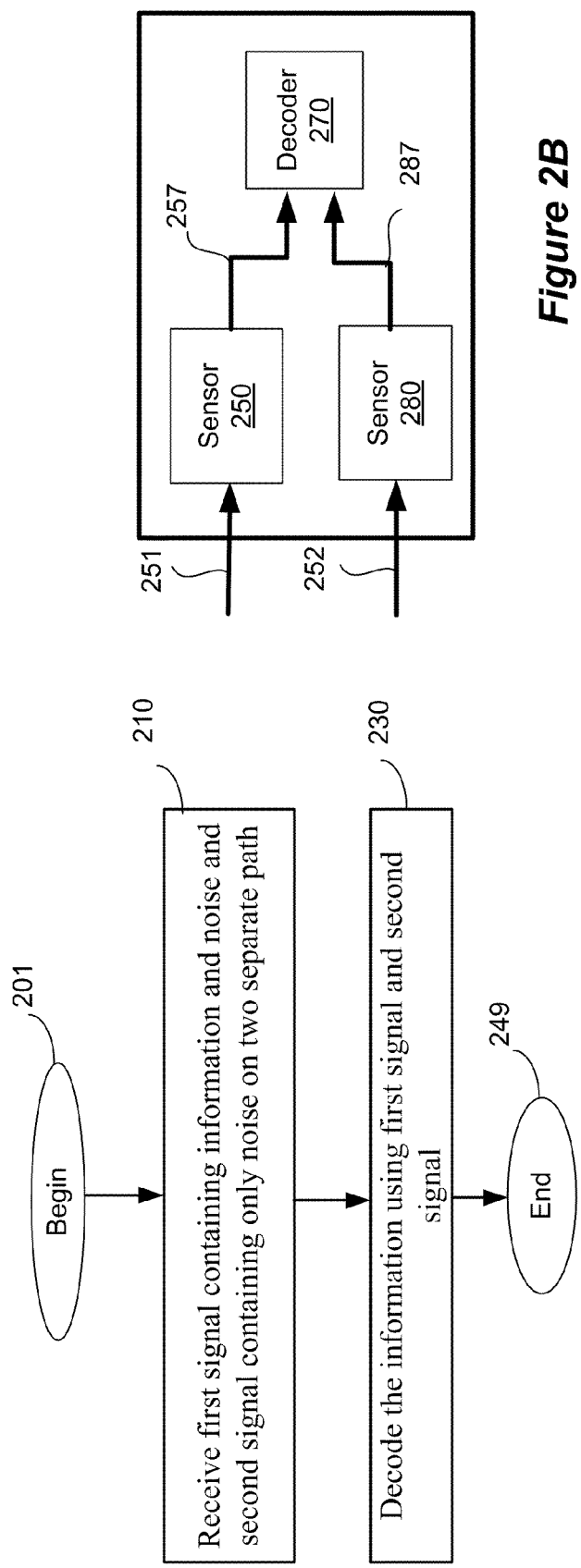

REDUCING THE EFFECT OF NOISE IN A MULTI-CHANNEL TELECOMMUNICATION RECEIVER

CROSS REFERENCE TO RELATED APPLICATION

Under 35 U.S.C. §119, this application claims priority to, and the benefit of, U.S. Provisional Patent Application No. 60/927,696 filed on May 4, 2007, and entitled "Method and Apparatus for Crosstalk Diversity Receiver," which is incorporated herein by reference.

BACKGROUND

1. Field of the Invention

The present invention relates generally to telecommunication receivers and particularly to reducing the effect of noise in a multi-channel communication receiver.

2. Related Art

In telecommunication system channel in general refers to a band of frequencies used for transferring desired information in digital system. For the purposes of this disclosure data and information are used interchangeably. Often such channels are implemented on various communication medium, for example, copper wire, air, or optical cable. Information transfer capacity of each communication medium is measured in terms of bandwidth/data rate (frequency range).

In order to achieve an increased data rate, also called information transfer capacity, multiple channels are combined to form a single logical channel between a transmitter and a receiver. Accordingly transmitter is implemented to suitably encode the data for transmission on multiple channels. The encoded data is then transmitted on multiple channels, such that the signal/carrier on each channel carries a portion of information.

Similarly, the receiver is implemented to receive encoded data from multiple channels and decode collectively to extract the desired information. Multi-channel system is often referred to as multi-carrier system since multiple carriers are used for transmitting on corresponding multi-channels.

Multiple channels may be implemented using a single communication medium. For example, the total frequency range supported by a medium is divided into multiple sub bands. The information is then collectively transmitted on each sub band. Discrete multitone (DMT) orthogonal frequency-division multiplexing (OFDM) system represents an example of such a multi-channel communication system.

Alternatively, multiple communication medium, each having a fixed bandwidth, may be combined to form multiple channels between a transmitter and a receiver. The information is then transmitted collectively on each medium. For example, a number of individual copper wires, each having a fixed bandwidth, may be bundled to form a channel, collectively having larger bandwidth. A bonded DSL system represents an example of such communication system.

Signal on each channel is often affected from noise. One source of noise may be interference from the co-channels that are part of the multi-channel system, forming a single logical channel. Similarly, other channels that are not part of the logical channel but are in the vicinity may also cause interference as another source of noise.

Such noise often reduces the quality of the received signal thereby reducing the rate of data transfer (data rate) on a single channel and multiple channel system. Hence it is desirable to reduce the effect noise at the receiver.

SUMMARY OF INVENTION

A telecommunications receiver, digital subscriber line (DSL or xDSL) system and method for extracting information from a signal are disclosed. Common among the embodiments is a signal sensor for receiving a first signal having an information component and a noise component, a noise sensor for receiving a second signal having only a noise component and a decoder for extracting the information component from the first signal using the first and second signals. The first signal can represent an xDSL signal on a pair of conducting wires; the signal sensor can represent a pair of conducting pads implemented to receive said xDSL signal; and the noise sensor represents a pair of conducting pads connected to a dummy conducting wire.

Furthermore, the first signal can comprise a plurality of sub-signals, the second signal can also comprise a plurality of sub-signals, the signal sensor can comprise a plurality of sub-signal sensors each receiving one of the sub-signals in the first signal, and the noise sensor can comprise a plurality of sub-signal sensors each receiving one of the sub-signals in the second signal. Each sub-signal of the first signal can be on a pair of conducting wires and each sub-signal sensors represents a pair of conducting pads connected to a pair of conducting wires. The plurality of sub-noise sensors operate in pairs wherein each sub-signal represents a common signal received on each said pair. The decoder can extract the information using a matrix $G[q,t]$ as described below.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The present invention will be described with reference to the following accompanying drawings.

FIG. 2A is a flowchart illustrating the operation of a receiver in an embodiment of the present invention;

FIG. 2B is block diagram of a receiver implemented to receive first signal and the second signal in one embodiment;

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A telecommunication receiver provided according to present invention receives first signal containing information and noise and receives a second signal containing only noise. Receiver then decodes the information using first signal and second signal. In one embodiment, two sensors are provided; one of the sensors is implemented to receive first signal and other sensor is implemented to receive second signal. Due to the knowledge of the noise received on second sensor, the similar noise content on the first signal may be reduced.

In another embodiment of the present invention, a bonded DSL receiver with k signal sensors is implemented with additional s number of sensors (noise only sensor) to receive only noise. Accordingly, joint demodulation is performed using signals received on k signals sensors and s noise only sensors.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1A:
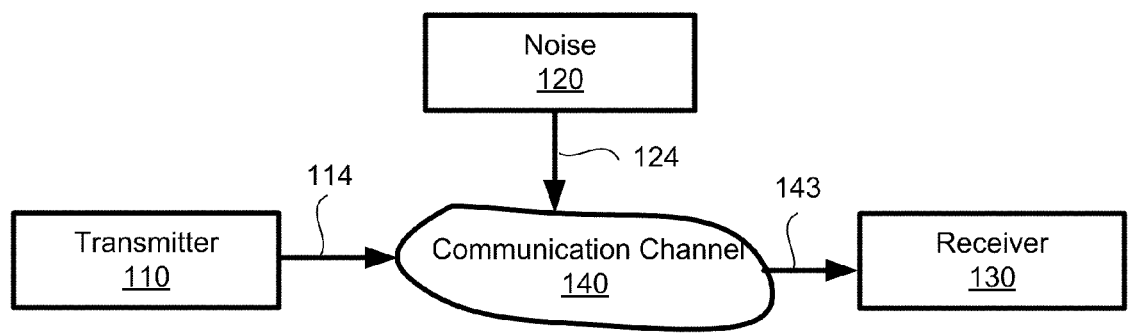
FIG. 1A is a block diagram of communication system illustrating example environment in which various aspects of the present invention may be implemented.

FIG. 1A is a block diagram of communication system illustrating example environment in which various aspects of the present invention may be implemented. Communication system is shown containing transmitter 110, noise 120, communication channel 140 and receiver 130. Each block is described below in further detail.

Transmitter 110 transmits a signal carrying data/information on path 114. Transmitter 110 may generate transmitted signal by encoding and/or modulating the data. The transmitter may adapt an encoding technique based on various parameters, for example, characteristics of the communication medium, capacity, and/or nature of the data.

The encoded data may be then converted to analog signal/carrier, carrying information, using suitable modulation scheme. Transmitter 110 may be implemented to transmit data using various modulation techniques such code division multiple access (CDMA), OFDM, DMT. Transmitter 110 may be implemented according to various communication standards such as, xDSL which are apparent to those skilled in the art.

Communication channel 140 propagates the signal received on paths 114 and 124, transmitted signals carrying information and noise respectively, to path 143. Communication channel 140 may operate as adder to add the noise received on path 124 to signal received on path 114. As a result transmitted signal affected by noise is provided on path 143.

Communication channels 140 may be implemented as single channel or multiple channels logically operative as a single channel. Channel 140 may be implemented on a copper wire, multiple copper wires, cable, air, optical cable and other communication medium.

Noise 120 represents the unwanted signal from various sources. For example, noise 120 may contain a white noise, interference from other channels, crosstalks such as far end crosstalk, near end crosstalk, self crosstalk, in the case of multi-channel system, alien crosstalk and others that would be apparent to those of ordinary skill in the art.

Receiver 130 receives transmitted signal (information/data) affected by noise on path 143 from communication channel 140. Based on the encoding and modulation technique adapted at transmitter 110, receiver may be implemented to reduce the effect of noise and extract the desired data.

Receiver 130 can be implemented as described below.

Figure 1B:
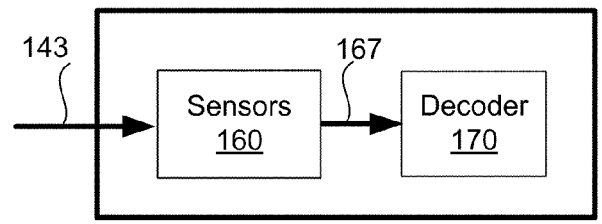
FIG. 1B is a block diagram illustrating a receiver in a prior embodiment.

FIG. 1B is a block diagram illustrating a receiver in a prior embodiment. The receiver is shown containing a sensor 160 and decoder 170. Sensor 160 operates to receive the signal from the channel 140. Sensor 160 may sense the transmitted signal when in contact with a channel and may provide the sensed signal to decoder 170 in a suitable form.

Signal sensed by a sensor is often referred to as a received signal. Sensor 160 may perform an initial signal processing operations such as amplification, clipping, and filtering, signal transition on the received signal and may provide the processed signal on path 167.

Sensor 160 may be implemented to sense signals from a several communication mediums such as air, copper wire, and optic fiber. An antenna designed to receive signals with specific frequency band represents an example sensor implemented in a wireless receiver. Similarly, a conducting pad making contact with copper wire represents an example sensor in a copper wire communication receiver. In the case of a multiple channel communication system, sensor 160 represents an array of such sensors, such as multi-input multi-output (MIMO) sensors receiving the signal in the respective channels.

It may be appreciated from the above description that sensor 160, each sensor in case of multiple communication system, receives a transmitted signal affected by noise. Decoder 170 may decode the data based on modulation and encoding techniques adapted at the corresponding transmitter. Since encoding and modulation techniques can reduce only some of the noise components, several other noise components are not reduced in the prior receiver.

Implementation of receiver 130 as described above can overcome many of the disadvantages previously described. This is apparent in light of the following sections.

3. Receiver Having Noise Alone Sensors

FIG. 2A is a flowchart illustrating the operation of a receiver in an embodiment of the present invention. The flowchart is described with reference to FIG. 1 merely for illustration. The flowchart begins in step 201 and control passes to step 210.

In step 210, a communication receiver, such as receiver 130 receives a first signal containing information and noise and second signal containing only noise on two separate paths. In the case of multichannel communication, a first set of paths may receive signal containing information while a second set of paths receives only noise.

In step 230, the communication receiver decodes the information using the first signal and the second signal. Since the receiver receives only noise component on a separate path, decoder, such as decoder 170, may be implemented to make use of the noise component to reduce the effect of noise while decoding data from the first signal.

Since only the noise is provided on a separate path, decoder may decode the information by considering the noise as additional parameter. For example, decoder may extract several characteristics of noise provided on separate path and effectively eliminate the similar content from the received signal containing information.

Manner in which the receiver may be implemented to receive the first signal and the second signal in an embodiment of the present invention is described below with reference to FIG. 2B.

FIG. 2B is block diagram of a receiver implemented to receive first signal and the second signal in one embodiment. The block diagram is shown containing sensors 250 and 280, decoder 270. Each block is described below in further detail.

Sensor 250 receives the first signal containing information. Sensor 250 may be implemented similar to the sensor 160 in FIG. 1. Sensor 250 provides the first signal to decoder on path 257.

Sensor 280 receives the second signal containing only noise. For example, in case of copper wire communication, the sensor 280 may be implemented as interface pad without connecting to the copper wire carrying the signal. As another example, sensor 280 may be implemented as dummy copper wire of desired length running along with the copper wire carrying information. As a result, the noise or interference experienced by the information carrying copper is captured on dummy copper wire and provided as only noise. Similarly, in the case of wireless communication, sensor 280 may be implemented to capture only the noise or interference caused in the vicinity of the receiving terminal 250 using methods known to those skilled in the art.

Decoder 270 extracts the information from the first signal using the contents of both the first signal and the second signal. Manner in which information may be decoded using the content of the first signal and the second signal is described with reference to a multi-channel communication system. Accordingly, an example multi-channel communication system is described first below.

4. Example Multi-Channel Communication System

Figure 3:
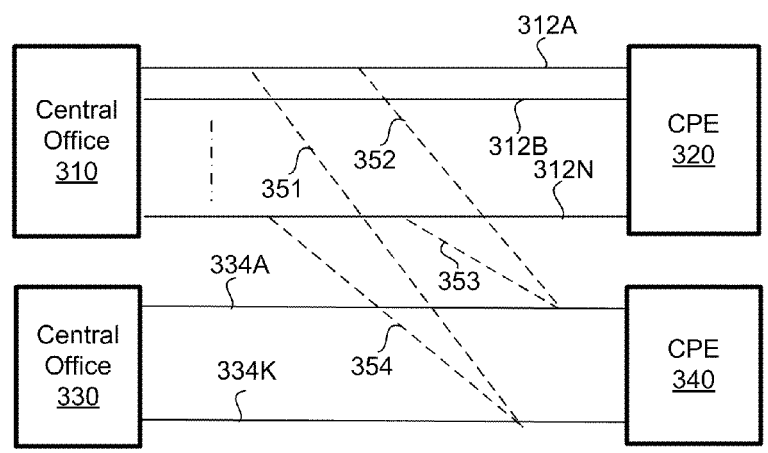
FIG. 3 is a block diagram of a bonded DSL communication system illustrating an example multi-channel communication system.

FIG. 3 is a block diagram of a bonded DSL communication system illustrating an example multi-channel communication system. The block diagram is shown containing central offices 310 and 330, and customer premises equipments (CPE) 320 and 340. Each block is described below in further detail.

Central office 310 transmits the information on multiple channels 312A-312N. Central office 310 may adapt any suitable encoding and modulation technique to split the desired information (being transmitted) into N number of independent signals. The N number of signals is then correspondingly transmitted on the N channels 312A-312N. Thus, channels 312A-312N together operate as single logical channel between central office 310 and CPE 320.

In one embodiment, central office 310 may transmit signal according to the International Telecommunication Union (ITU) standards G.998.x. The channel 312A-312N operates as bonded DSL Lines. Each channels 312A-312N represents a pair of copper wire carrying a differential signal (signal that are opposite in polarity and equal in magnitude). Pair of copper wire together represents a single channel.

CPE 320 receives N independent signal carrying information and decodes N signals to extract the desired information. CPE 320 may incorporate multiple sensors, for example N number of conductor pads making contact with corresponding N channels 312A-312N. CPE 320 and central office 310 may adapt any known MIMO technology to receive/transmit multiple signals. CPE 320 may be implemented in conjunction with the implementation of central office 310.

Similarly, central office 330, channels 334A-334K and CPE 340 are implemented similar to the corresponding descriptions above and are briefly described below for conciseness.

Briefly, central office 330 operates similar to operation of central office 310. Central office 330 generates K number of signals each carrying portion of desired information and transmits on K channels 334A-334K. Channels 334A-334K are implemented similar to channels 312A-312N. Accordingly, channels 334A-334K operate together as single logical channel. CPE 340 receives the signal from K number of channel 334A-334K and extract information.

One of the noted disadvantages in the multichannel system is interference from the co-channels due to close proximity of channels, for example, a signal on each channel 312A-312N interfering with other co-channels that are part of one logical channel. Often such interference is referred to as self crosstalk as well known in the field of art. According to one prior approach, such noise is often reduced by performing joint demodulation at the CPE 320 and/or 340. For example in case of bonded xDSL system, channels in single bonding are jointly demodulated.

However, in various situations, channels 312A-312N and 334A-334K are laid in close proximity. As a result, signals on channels 312A-312N may interfere with signals on channel 334A-334K. Since channels 334A-334K are not part of the logical channels formed by channels 312A-312N, often such interference is referred to as alien crosstalk.

For example, in FIG. 3, lines 351, 352, 353, and 354 represent the alien crosstalkers. Namely, line 351 represents the interference on channel 334A from channel 312A. Often such interference reduces the transmission bit rate on the multi-channel system.

Manner in which a receiver in one embodiment of the present invention may reduce the effect of noise noted above is described in further detail.

5. Example Receiver

Figure 4:
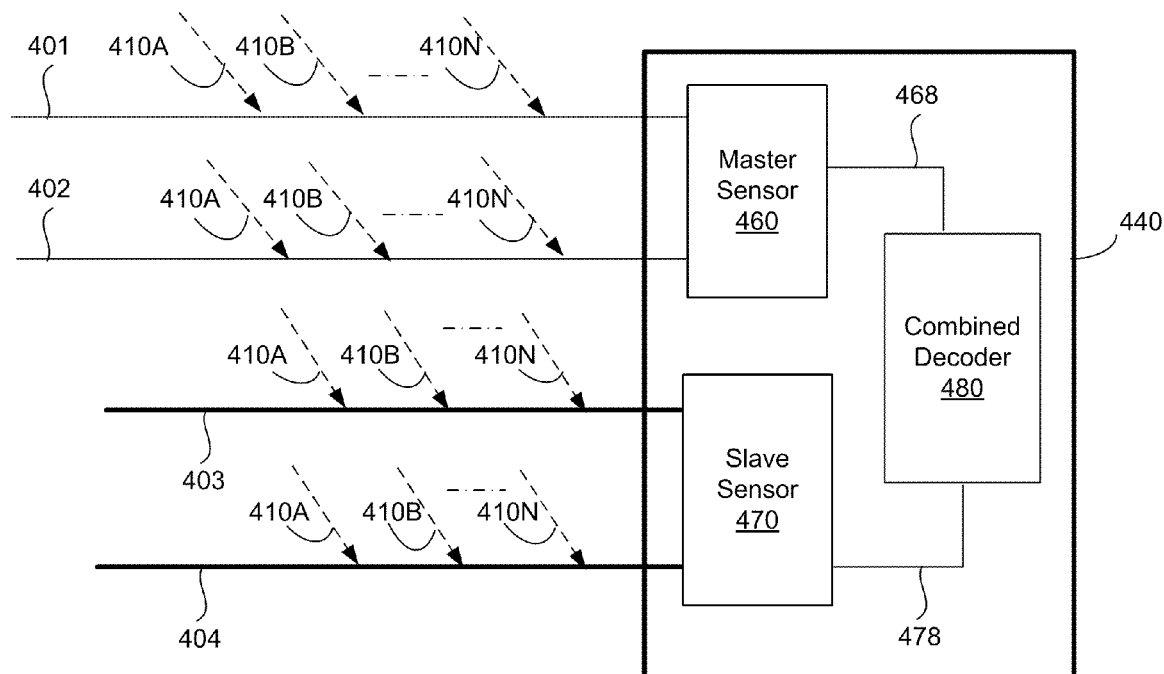
FIG. 4 is a block diagram of a receiver in one embodiment of the present invention.

FIG. 4 is a block diagram of a receiver in one embodiment of the present invention. Receiver 440 is shown containing master sensor 460, slave sensor 470, copper wires 401-404, and combined decoder 480. Each block is described below in further detail.

Receiver 440 is described with reference to xDSL system merely for ease of understanding. However, the extension of the approaches to other communication systems will be apparent to one skilled in the relevant art by reading the disclosure provided herein, and such implementations are contemplated to be covered by various aspects of the present invention.

Continuing with the description, copper wires 401 and 402 represent the xDSL copper wire pair. Wires 401 and 402 together carry information as differential signal transmitted from an xDSL transmitter. Copper wire 401 and 402 are shown receiving interferences 410A-410N from N noise sources, for example, alien noise from an N channels in the proximity.

Master sensor 460 is shown connected to copper wires 401 and 402. Master sensor 460 may be implemented as pair of connecting pads and the wires 401 and 402 are electrically connected to the pads. Sensor may further contain additional circuitry, such as impedance matching and other components, to receive the signal on wires 401 and 402. Master sensor 460 receives differential signal affected by N noise sources and provides the received signal on path 468 for decoding.

Slave sensor 470 is shown connected to pair of conductors 403 and 404 of a desired length. Each conductor 403 and 404 are shown receiving noise 410A-410N from the same N noise sources. However, magnitude of noise 410A-410N received on each conductor 401 through 404 may be different based on the proximity and other parameters.

Slave sensors 470 may be implemented similar to the implementation of master sensor 460 with two conductor pads. One end of each conductor 403 and 404 is connected to the pads. Other end of the conductors 403 and 404 are left unconnected. As a result, slave sensor 470 receives only noise components 410A-410N.

The length of the conductors 403 and 404 may be varied to receive a desired noise signal. For example a shorter length may receive a near end crosstalk. Further in an alternative embodiment, slave sensor 470 may be connected to a dummy copper wire of a desired length or an unused copper wire in a bonded DSL cable. In a yet another alternative embodiment, conductor 403 and 404 may be implemented as part of the sensor pad. Sensor 470 provides the noise signal on path 478 for decoding.

Combined decoder 480 receives the xDSL differential signal affected by noise 410A-410N on path 468 and only noise component 410A-410N on path 478. Combined decoder extract the data using signal received on path 468 and 478. Manner in which combined decoder may implemented to perform combined decoding is described below.

6. Combined Decoding

Combined decoding is illustrated with reference to K bonded xDSL system. However, the technique is briefly described for completeness. In K bonded xDSL system, K numbers of xDSL copper pairs (401 and 402 representing one of such pair) are bonded together.

The channels containing K pairs are represented using the transfer function $H_K$. The bonded xDSL transmitter use DMT technique and transmit the information on K channels. The transmitted signal may be mathematically represented as vector $x_k$ of K dimension.

Accordingly, receiver 440 may be implemented with k number of master sensor 460 receiving k xDSL differential signals transmitted a vector $x_k$. Similarly, an S number of slave sensor 470 may be implemented with each conductor 403 and 404 having a desired length to capture a desired noise. Accordingly, decoding technique is described for receiver containing K number master sensor 460 and S number of slave sensor 470.

The received vector $y_k[q,t]$ on the bonded pairs (at master sensor and provided on path 468) at time instant t, and per frequency q (tone) is given by:

$$y_k[q,t] = (H_k x_k)[q,t] + z_{N,k}[q,t] + w_k[q,t] \quad \text{Equation 1}$$

wherein $H_k$ represents a K×K channel response matrix (as noted above) for bonded pairs, $x_k$ represents the transmit vector, $z_{N,k}$ represents the alien crosstalk noise from N noise sources and $w_k$ is the white noise received at the bonded pairs.

Similarly the received vector $y_s[q,t]$ (provided on path 478) on S number of slave sensors, i.e., noise only reference sensors implemented in common mode discussed in the later section may be represented as:

$$y_s[q,t] = z_{N,s}[q,t] + w_s[q,t] \quad \text{Equation 2}$$

wherein $z_{N,s}$ represents the alien crosstalk noise and $w_s$ represents the white noise received on slave sensors.

At DMT symbol time instant t and frequency (tone) q, an optimum receiver for the joint demodulation of the received signal vectors on bonded pairs and the extra sensors is obtained by solving the optimization problem described below.

A demodulation matrix G[q,t] (a K×(K+S) matrix) needs to be determined such that the following performance index (mean square error) is minimized as given by:

$$E\left\{\left\|\left(x_k - G\begin{bmatrix} y_k \\ y_s \end{bmatrix}\right)[q,t]\right\|^2\right\} \quad \text{Equation 3}$$

wherein, E represents the expected value or mean of the expression in brackets, which is the square of the demodulation error.

The solution to Equation 3 may be provided in the following forms (Equation 4-7).

$$G[q,t] = E\left\{x_k \begin{bmatrix} y_k \\ y_s \end{bmatrix}^*\right\} E\left\{\begin{bmatrix} y_k \\ y_s \end{bmatrix}\begin{bmatrix} y_k \\ y_s \end{bmatrix}^*\right\}^{-1} [q,t] \quad \text{Equation 4}$$

$$G[q,t] = E\{[x_k y_k^* \; x_k y_s^*]\} E\left\{\begin{bmatrix} y_k y_k^* & y_k y_s^* \\ y_s y_k^* & y_s y_s^* \end{bmatrix}\right\}^{-1} [q,t] \quad \text{Equation 5}$$

$$G[q,t] = [E(x_k y_k^*) \; E(x_k y_s^*)] \begin{bmatrix} E(y_k y_k^*) & E(y_k y_s^*) \\ E(y_s y_k^*) & E(y_s y_s^*) \end{bmatrix}^{-1} [q,t] \quad \text{Equation 6}$$

$$G[q,t] = [E(x_k x_k^* H_k^*) \; [0]_{k \times s}]$$
$$\begin{bmatrix} E(H_k x_k x_k^* H_k^* + z_{N,k} z_{N,k}^* + w_k w_k^*) & E(z_{N,k} z_{N,s}^*) \\ E(z_{N,s} z_{N,k}^*) & E(z_{N,s} z_{N,s}^* + w_s w_s^*) \end{bmatrix}^{-1}$$
$$[q,t] \quad \text{Equation 7}$$

From equation 6 to equation 7, it is assumed that input vector alien noise and white noise at the master/sensor receiver have zero mean and their cross covariance is zero.

Using a stochastic approximation based solution (LMS), the combined decoding (demodulation) matrix G[q,t] is provided as:

$$G[q,t] = $$
$$G[q,t-1] + \Lambda\left(x_k[q,t] - G[q,t-1]\begin{bmatrix} y_k \\ y_s \end{bmatrix}[q,t]\right)\begin{bmatrix} y_k \\ y_s \end{bmatrix}^*[q,t] \quad \text{Equation 8}$$

wherein, Λ represents the step size for iteratively selecting the coefficients of the matrix. With appropriately chosen value of Λ, Equation 8 converges to an optimal solution.

Manner in which slave sensor may be implemented to receive a common mode signal, as noted above, is described with reference FIG. 5.

Figure 5:
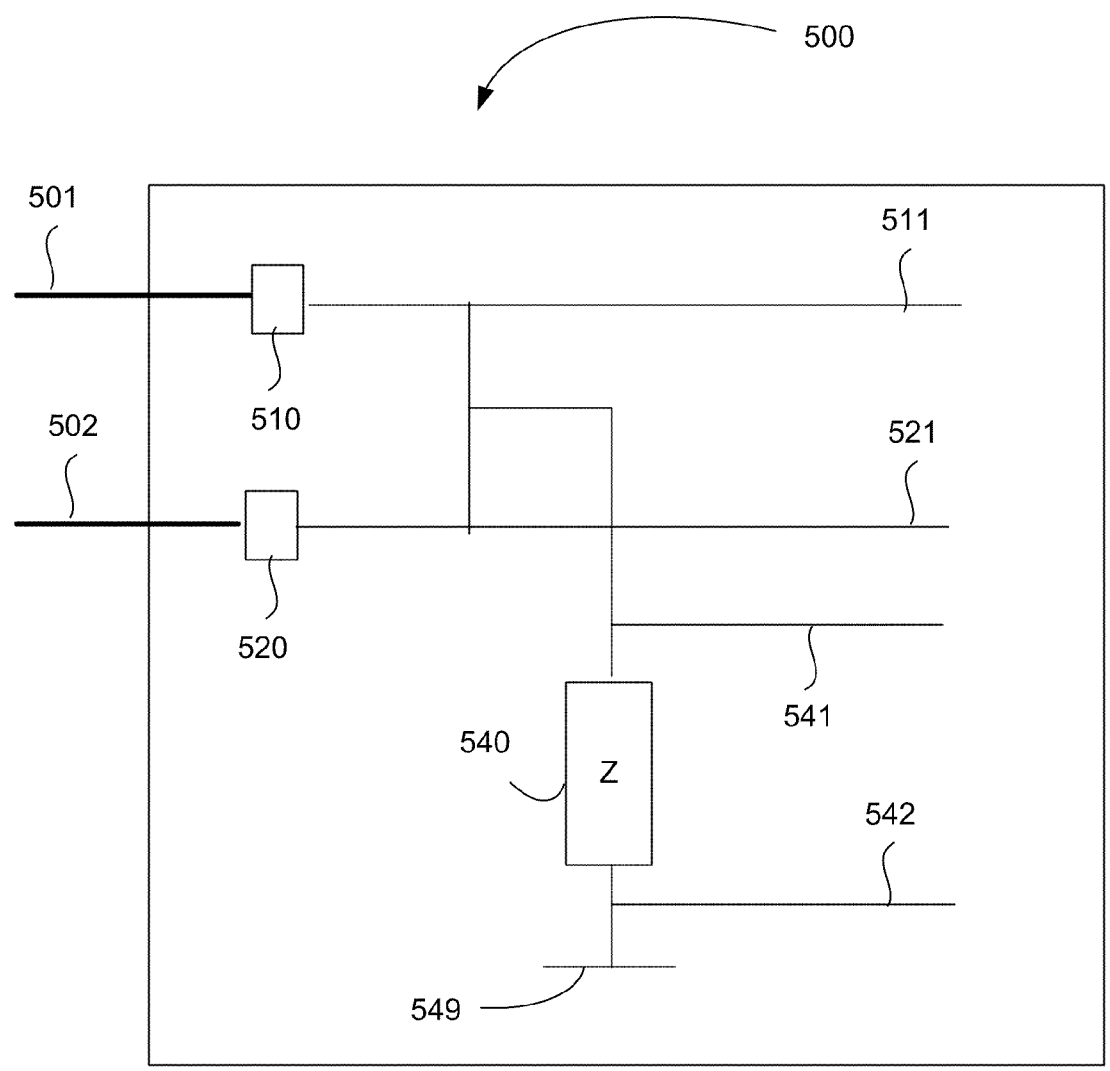
FIG. 5 is a circuit diagram illustrating an example slave sensor implemented to receive signals in common mode.

FIG. 5 is a circuit diagram illustrating an example slave sensor 500 implemented to receive signals in common mode. Shown there are pads 510 and 520, and impedance (Z) 540. Pads 510 and 520 represent conducting pads implemented to provide electrical connectivity to extended conductor 501 and 502, respectively. Alternatively, pads 510 and 520 may be connected to a dummy copper pair of a bonded DSL cable not carrying the signal.

One end of impedance 540 is shown electrically connected to both lines 511, 521 from pads 510, 520 respectively, and the other end of the impedance 540 is connected to a common reference 549, for example, a ground potential. The output between the impedance 540 (between terminals 541, 542) represents the common mode signal received on pads 510 and 520.

Figure 6A:
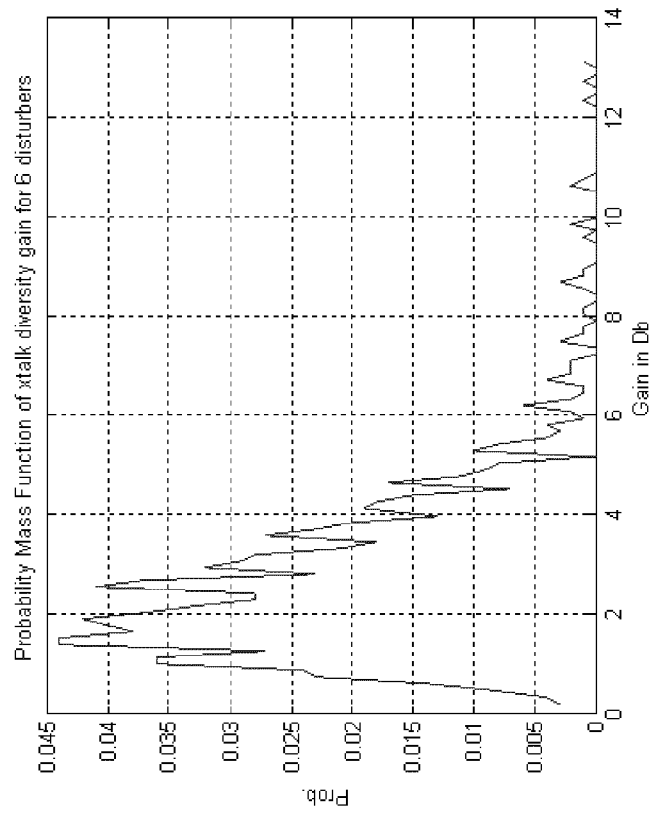
FIGS. 6A and 6B are the graph illustrating the example results.
Figure 6B:
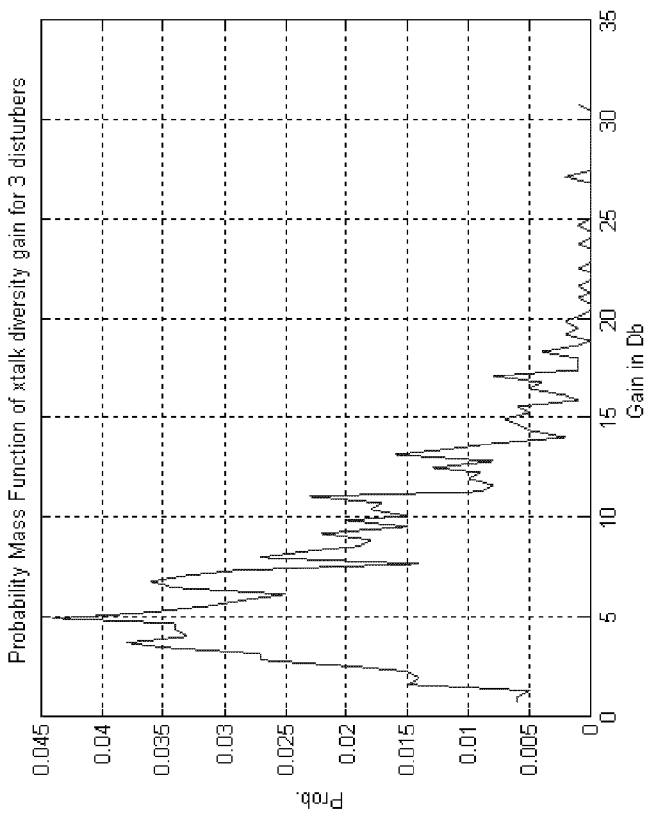

FIGS. 6A and 6B are graphs illustrating the performance of the receiver in several embodiments. The upper bounds on the expected gain are computed through the simulations. FIG. 6A illustrates probability mass function of crosstalk diversity gain for 3 disturbers (noise sources) with two pair bonded DSL. The average gain in this case is measured as to be 7.42 dB. Similarly FIG. 6B illustrates mass function of crosstalk diversity gain for 6 disturbers with two pair bonded DSL. The average gain is measured as 2.76 dB.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

We claim:

1. A method comprising:
receiving, at a receiver, a first signal containing information and noise on a communication channel;
receiving, at said receiver, a second signal containing only noise on a dummy channel; and
extracting said information by jointly demodulating said first signal and said second signal, thereby reducing effect of noise while extracting said information in the receiver.

2. The method of claim 1, wherein the first signal is received by a signal sensor and the second signal is received by a noise sensor.

3. The method of claim 2, wherein
said first signal represents a xDSL signal on a pair of conducting wires implementing said communication channel;
said signal sensor represents a first pair of conducting pads implemented to receive said xDSL signal; and
said noise sensor represents a second pair of conducting pads connected to a dummy conducting wire implementing said dummy channel.

4. The method of claim 2, wherein
said first signal comprises a plurality of first sub-signals;
said second signal comprises a plurality of second sub-signals;
said signal sensor comprises a plurality of sub-signal sensors wherein each of said plurality of sub-signal sensor receives one of said plurality of first sub-signals; and
said noise sensor comprises a plurality of sub-noise sensors, wherein each said sub-noise sensors receives one of said plurality of second sub-signals.

5. The method of claim 4, wherein
said plurality of first sub-signals represents a plurality of xDSL signals, each xDSL signal corresponds to a first pair of conducting wires; and
said plurality of sub-signal sensors represents a plurality of pairs of conducting pads, each pair of conducting pads corresponds to the first pair of conducting wires.

6. The method of claim 4, wherein said plurality of sub-noise sensors operates in pairs wherein each said second sub-signal represents a common signal received on each said pair.

7. The method of claim 4, wherein the extracting comprises using a matrix G[q,t], wherein $$G[q,t] = G[q,t-1] + \Lambda \left( x_k[q,t] - G[q,t-1] \begin{bmatrix} y_k \\ y_s \end{bmatrix}[q,t] \right) \begin{bmatrix} y_k \\ y_s \end{bmatrix}^*[q,t]$$

such that $E\left\{ \left\| \left( x_k - G \begin{bmatrix} y_k \\ y_s \end{bmatrix} \right)[q,t] \right\|^2 \right\}$ is minimized, wherein t represents a time instant and q represents a frequency of a sub-signal;
wherein $y_k$ represents said first signal comprising k first sub-signals received on k pairs of said conducting wires connected to k pairs of said sub-signals sensors;
wherein $y_s$ represents said second signal comprising s second sub-signals received on s pairs of conducting wires connected to s pair of said sub-noise sensors, and
$x_k$ represents said information component in said first signal.

8. The method of claim 7, wherein said k pairs represent the k channels of a bonded xDSL system and s pairs represent the unused channels in said bonded xDSL system.

9. A telecommunications receiver comprising:
a signal sensor receiving a first signal having an information component and a noise component on a communication channel;
a noise sensor receiving a second signal having only the noise component on a dummy channel; and
a decoder extracting said information component from said first signal by jointly demodulating said first signal and said second signal.

10. The telecommunications receiver of claim 9, wherein
the signal sensor comprises a signal sensing means for receiving the first signal;
the noise sensor comprises a noise sensing means for receiving the second signal; and
the decoder comprises a decoding means for extracting the information component.

11. The telecommunications receiver of claim 9, wherein
said first signal represents a xDSL signal on a pair of conducting wires implementing said communication channel;
said signal sensor represents the first pair of conducting pads implemented to receive said xDSL signal; and
said noise sensor represents a second pair of conducting pads connected to a dummy conducting wire implementing said dummy channel.

12. The telecommunications receiver of claim 9, wherein
said first signal comprises plurality of first sub-signals;
said second signal comprises plurality of second sub-signals;
said signal sensor comprises plurality of sub-signal sensors wherein each of said plurality of sub-signal sensor receives one of plurality of said first sub-signals; and
said noise sensor comprises plurality of sub-noise sensors, wherein each said sub-noise sensors receives one of said plurality of second sub-signals.

13. The telecommunications receiver of claim 12, wherein
said plurality of first sub-signals represents a plurality of xDSL signals, each xDSL signal corresponds to a first pair of conducting wires; and
said plurality of sub-signal sensors represents a plurality of pairs of conducting pads, each pair of conducting pads corresponds to the first pair of conducting wires.

14. The telecommunications receiver of claim 13 wherein said plurality of sub-noise sensors operates in pairs wherein each said second sub-signal represents a common signal received on each said pair.

15. The telecommunications receiver of claim 14, wherein said decoder extracts the information using a matrix G[q,t], wherein $$G[q,t] = G[q,t-1] + \Lambda\left(x_k[q,t] - G[q,t-1]\begin{bmatrix}y_k\\y_s\end{bmatrix}[q,t]\right)\begin{bmatrix}y_k\\y_s\end{bmatrix}^*[q,t]$$

such that $E\left\{\left\|\left(x_k - G\begin{bmatrix}y_k\\y_s\end{bmatrix}\right)[q,t]\right\|^2\right\}$ is minimized, wherein t represents a time instant and q represents a frequency of a sub-signal;

wherein $y_k$ represents said first signal comprising k first sub-signals received on k pairs of said conducting wires connected to k pairs of said sub-signals sensors;

wherein $y_s$ represents said second signal comprising s second sub-signals received on s pairs of conducting wires connected to s pair of said sub-noise sensors, and $x_k$ represents said information component in said first signal.

16. The telecommunications receiver of claim 15, wherein said k pairs represent the k channels of a bonded xDSL system and s pairs represent the unused channels in said bonded xDSL system.

17. A system for receiving a bonded DSL signal:

a first plurality of pairs of sensors connected to a first plurality of said differential DSL channels each carrying a bonded DSL signal, wherein each bonded DSL signal comprises an information component and a noise component;

a second plurality of pairs of sensors connected to second plurality of dummy differential channels each carrying only noise; and a decoder extracting said information component from said bonded DSL signal by jointly decoding and demodulating the signals received on said first plurality of pairs of sensors and said second plurality of pairs of sensors.

18. The system of claim 17, wherein the decoder comprises a decoding means for extracting the information component.

19. The system of claim 17, wherein said decoder extracts the information using a matrix G[q,t], wherein $$G[q,t] = G[q,t-1] + \Lambda\left(x_k[q,t] - G[q,t-1]\begin{bmatrix}y_k\\y_s\end{bmatrix}[q,t]\right)\begin{bmatrix}y_k\\y_s\end{bmatrix}^*[q,t]$$

such that $E\left\{\left\|\left(x_k - G\begin{bmatrix}y_k\\y_s\end{bmatrix}\right)[q,t]\right\|^2\right\}$ is minimized, wherein t represents a time instant and q represents a frequency of the bonded DSL signal;

wherein $y_k$ represents said first signal comprising k first sub-signals received on k pairs of said conducting wires connected to k pairs of said sub-signals sensors;

wherein $y_s$ represents said second signal comprising s second sub-signals received on s pairs of conducting wires connected to s pair of said sub-noise sensors, and $x_k$ represents said information component in said first signal.

20. The system of claim 19, wherein said k pairs represent the k channels of a bonded xDSL system and s pairs represent the unused channels in said bonded xDSL system.

* * * * *

UNITED STATES PATENT AND TRADEMARK OFFICE
CERTIFICATE OF CORRECTION

| | |
|---|---|
| PATENT NO. | : 8,369,426 B2 |
| APPLICATION NO. | : 12/114169 |
| DATED | : February 5, 2013 |
| INVENTOR(S) | : Singh et al. |

It is certified that error appears in the above-identified patent and that said Letters Patent is hereby corrected as shown below:

In the Claims:

In Column 10, Line 26, in Claim 9, delete "comprising;" and insert -- comprising: --, therefor.

In Column 11, Line 33, in Claim 17, delete "of said" and insert -- of --, therefor.

Signed and Sealed this
Tenth Day of September, 2013

Teresa Stanek Rea
*Acting Director of the United States Patent and Trademark Office*